Jan. 9, 1945.  C. J. WHITACRE  2,366,946
ADJUSTING MECHANISM FOR DUAL BRAKES
Filed Dec. 9, 1943
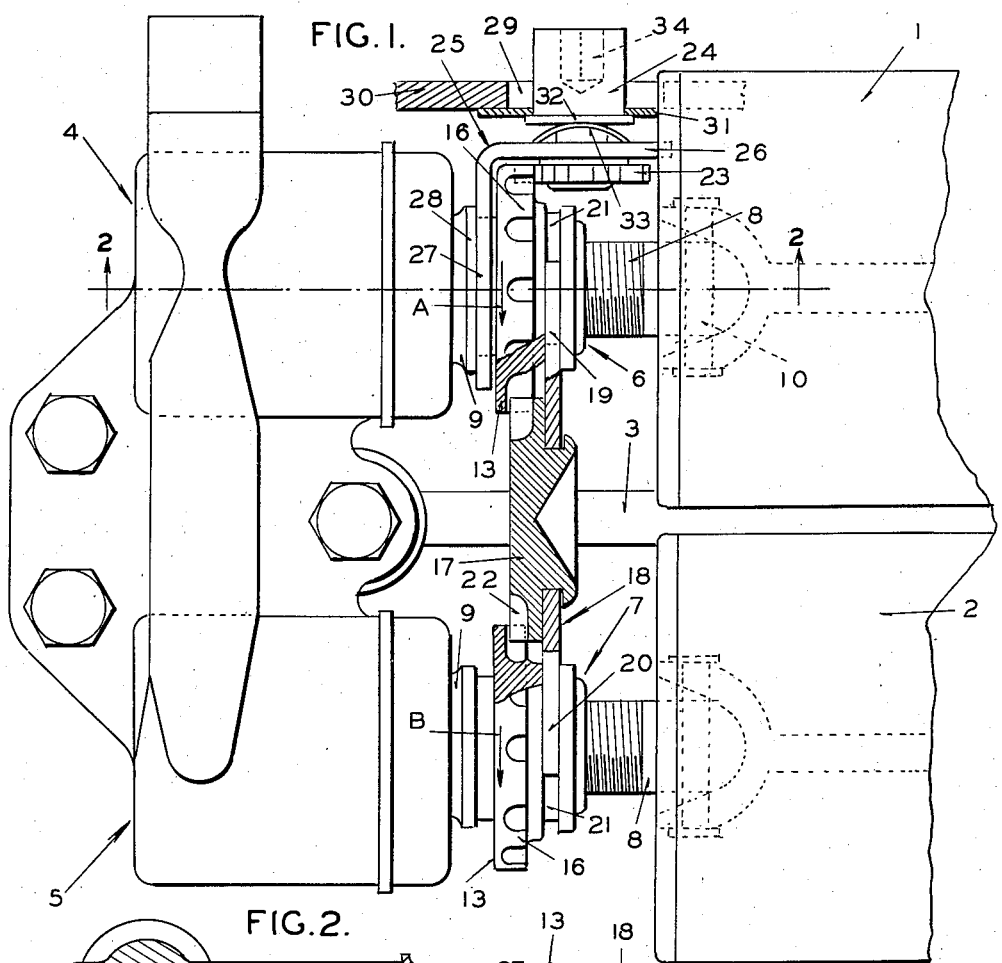
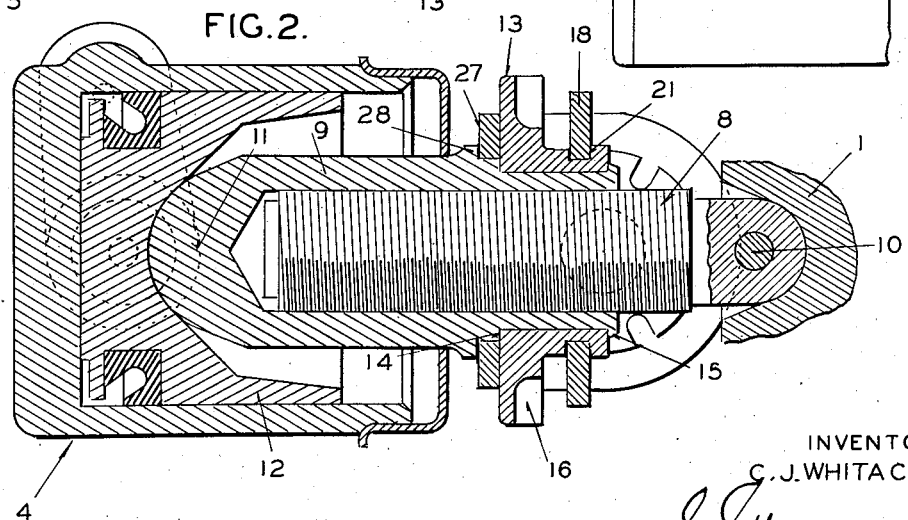
INVENTOR
C. J. WHITACRE
BY
ATTORNEY Patented Jan. 9, 1945

2,366,946

UNITED STATES PATENT OFFICE 2,366,946

ADJUSTING MECHANISM FOR DUAL BRAKES

Clarence J. Whitacre, St. Louis, Mo., assignor to Wagner Electric Corporation, St. Louis, Mo., a corporation of Delaware Application December 9, 1943, Serial No. 513,570

8 Claims. (Cl. 188—79.5)

My invention relates to brakes and more particularly to adjusting mechanism for brake shoes thereof.

One of the objects of my invention is to provide improved means for simultaneously adjusting like shoes of a dual brake.

Another object of my invention is to associate with the adjustable actuating connections for similar brake shoes of a dual brake, means operable by a single control member for simultaneously operating said connections to cause like changes in their lengths.

Other objects of my invention will become apparent from the following description taken in connection with the accompanying drawing in which Figure 1 is a top view of a portion of a dual brake showing adjusting means embodying my invention and associated with the actuating means for two of the shoes; and Figure 2 is a sectional view taken on the line 2—2 of Figure 1.

Referring to the figures in detail, the dual brake shown as having my invention embodied therein comprises two shoes 1 and 2 mounted on a support 3 positioned between said shoes. Shoe 1 is actuated by a fluid motor 4 and shoe 2 by a fluid motor 5, both fluid motors also being mounted on support 3. Between the fluid motor 4 and brake shoe 1 is an adjustable connection generally indicated by the numeral 6. A like adjustable connection 7 is situated between fluid motor 5 and brake shoe 2. Since these connections are alike, only connection 6 will be described in detail. However, the same reference characters will be used to indicate the like parts of both connections.

As shown in Figures 1 and 2, a threaded link 8 has mounted thereon a cylindrical link 9 having internal threads cooperating with the threads on link 8. Link 8 is pivotally connected to shoe 1 by a pin 10 and the cylindrical link 9 is provided with a spherical end 11 for cooperation with the piston 12 of fluid motor 4. Cylindrical link 9 has secured thereto a gear 13 which is held thereon between shoulders 14 and 15. The teeth 16 of this gear are cut only partially through the body of the gear. It is seen that by means of these connections when gear 13 of either connection is turned, the cylindrical link 9 will be turned, thus causing, by means of the cooperating threads, a relative axial movement between the two links. The turning of the gear in one direction will shorten the connection and the turning of it in the opposite direction will lengthen the connection.

Since shoes 1 and 2 are similar shoes of the dual brake and are actuated by simultaneously operated like fluid motors, the lining surfaces thereof will wear a substantially equal amount. Therefore, it is desirable that provision be made that when one of the shoes is adjusted, a like adjustment be made for the other shoe. With the adjustable connection employed between each fluid motor and a shoe as described, this can be conveniently accomplished by connecting the two gears 13 so that when one is turned in one direction, the other will be turned in the same direction and through an equal angle. In accordance with my invention, I provide an idler gear 17 for meshing with gears 13 of the two connections. This idler gear is journaled on a plate 18 which is provided with forked ends 19 and 20. Gears 13 have grooves 21 and end 19 is adapted to engage in one groove and end 20 is adapted to engage in the other groove. The teeth 22 of gear 17 are also cut only partially through the body of the gear and the gear is arranged so that these teeth will mesh with teeth 16 of gears 13. It is seen that by means of this idler gear when gear 13 of connection 6 is turned in the direction of the arrow A, gear 13 of connection 7 will be turned in the same direction as indicated by the arrow B. The angle of turning of both gears 13 will be the same and, therefore, there will be like adjustments of the two connections 6 and 7.

Means is provided for simultaneously operating both gears and, as shown, such consists of a single gear 23 meshing with gear 13 of connection 6. Gear 23 is secured to the inner end of a shaft 24 and this shaft is held in mesh with gear 13 by an L-shaped bracket 25, the leg 26 of which has shaft 24 journaled therein and the leg 27 thereof being journaled on the cylindrical link 9 of connection 6 and held in place between a shoulder 28 on said link and the body of gear 13. This arrangement permits the actuating gear 23 and its shaft 24 to move at all times with connections 6 and 7 whenever the fluid motors are operated to actuate the brake shoes. Shaft 24 is adapted to extend through a slot 29 in the backing plate 30 of the brake assembly. The cooperation between this slot and the shaft prevents any turning of the L-shaped bracket about the axis of connection 6. The slot is arranged so that the shaft is free to move with the connection. The slot may be closed by a washer 31 held in place by a flange 32 on the shaft. A spring washer 33 holds the shaft from shifting longitudinally. The shaft has an irregularly shaped bore 34 at its outer end for the reception of a suitable tool.

From the foregoing it is apparent that the adjusting mechanism just described, which is associated with the two connections between the two brake shoes and the two fluid motors, permits equal simultaneous adjustment of the shoes. The desired adjustments will result by merely turning shaft 24 from the exterior of the brake. The necessity for adjusting first one connection and then the other is eliminated. The person making adjustment will be certain that equal adjustments are being made to compensate for equal lining wear of the two shoes. The entire adjusting mechanism is supported on the two connections 6 and 7 and said mechanism moves bodily with the two connections whenever there is any movement thereof during actuation of the two brake shoes.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, two brake shoes positioned side by side, actuating members for each shoe, each shoe moving in the same direction, said members being simultaneously operable, a connection between each shoe and its actuating member, means to vary the length of each of said connections, means disposed between the connections and movable therewith for simultaneously varying the lengths of each of the connections an equal amount, and means comprising a single operator-operated control member to simultaneously vary the length of said connections.

2. In braking mechanism, two brake shoes positioned side by side, an actuating member for each shoe, said members being simultaneously operable, an adjustable connection between each shoe and its actuating member comprising a rotatable member for varying the length thereof, means carried by the connections and movable therewith for connecting said rotatable members together for simultaneous rotation in the same direction, and an operator-operated control member for turning one of the rotatable members.

3. In braking mechanism, two brake shoes positioned side by side, an actuating member for each shoe, said members being simultaneously operable, an adjustable connection between each shoe and its actuating member comprising a rotatable member for varying the length thereof, gear means carried by the connections and movable therewith for causing the rotatable members to rotate in the same direction, and operator-operated means connected for turning one rotatable member, said operator-operated means being carried for movement with said one rotatable member.

4. In braking mechanism, two brake shoes positioned side by side, an actuating member for each shoe, said members being simultaneously operable, an adjustable connection between each shoe and its actuating member comprising a rotatable member for varying the length thereof, toothed means carried by each rotatable member, a support extending between the two connections and carried thereby for movement therewith, a gear journaled on the support and meshing with both toothed means, and an operator-operated control means for turning one of the toothed means.

5. In braking mechanism, two brake shoes positioned side by side, an actuating member for each shoe, said members being simultaneously operable, an adjustable connection between each shoe and its actuating member comprising a rotatable member for varying the length thereof, toothed means carried by each rotatable member, a support extending between the two connections and carried thereby for movement therewith, a gear journaled on the support and meshing with both toothed means, an operator-operated gear meshing with one of the toothed members, and means for holding the last named gear in constant mesh with said toothed member and for causing it to be movable with the connection.

6. In braking mechanism, two brake shoes positioned side by side, an actuating member for each shoe, said members being simultaneously operable, an adjustable connection between each shoe and its actuating member comprising a rotatable member for varying the length thereof, said rotatable members being provided with grooves, toothed means carried by each rotatable member, a plate having forked ends positioned in the grooves of the rotatable members, a gear journaled on the plate and meshing with both toothed means, and an operator-operated gear meshing with one of the toothed members.

7. In braking mechanism, two brake shoes positioned side by side, an actuating member for each shoe, said members being simultaneously operable, an adjustable connection between each shoe and its actuating member comprising a rotatable member for varying the length thereof, said rotatable members being provided with grooves, toothed means carried by each rotatable member, a plate having forked ends positioned in the grooves of the rotatable members, a gear journaled on the plate and meshing with both toothed means, an operator-operated gear meshing with one of the toothed members, an L-shaped bracket having one leg journaled on the connection carrying the toothed means engaged by the last named gear, and means for journaling said last named gear in the other leg of the bracket.

8. In braking mechanism, two brake shoes positioned side by side, a fluid motor having a movable element for actuating each shoe, said fluid motors being simultaneously operable, a connection between each shoe and the movable element of its fluid motor, said connection comprising a threaded member non-rotatably connected to the shoe and a cooperating threaded member rotatably associated with the movable element of the fluid motor, toothed means carried by each rotatable threaded member of the connections, a plate supported on the rotatable members of the connecting means, a gear journaled on the plate and meshing with both toothed means, and operator-operated control means mounted to be carried by one connection for turning the toothed means of said connection.

CLARENCE J. WHITACRE.